US008365120B2

(12) United States Patent
Alpert et al.

(10) Patent No.: US 8,365,120 B2
(45) Date of Patent: Jan. 29, 2013

(54) RESOLVING GLOBAL COUPLING TIMING AND SLEW VIOLATIONS FOR BUFFER-DOMINATED DESIGNS

(75) Inventors: Charles J. Alpert, Austin, TX (US); Joachim G. Clabes, Austin, TX (US); Zhuo Li, Austin, TX (US); Tuhin Mahmud, Austin, TX (US); Stephen T. Quay, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 174 days.

(21) Appl. No.: 12/959,029

(22) Filed: Dec. 2, 2010

(65) Prior Publication Data
US 2012/0144358 A1 Jun. 7, 2012

(51) Int. Cl.
G06F 17/50 (2006.01)
(52) U.S. Cl. ........ 716/113; 716/110; 716/115; 716/132; 716/134
(58) Field of Classification Search .................. 716/110, 716/111, 113, 115, 118, 126, 132, 134
See application file for complete search history.

(56) References Cited

U.S. PATENT DOCUMENTS

| | | | |
|---|---|---|---|
| 6,117,182 A | 9/2000 | Alpert et al. | |
| 6,415,427 B2 * | 7/2002 | Nitta et al. | 716/129 |
| 6,442,745 B1 | 8/2002 | Arunachalam et al. | |
| 6,665,852 B2 * | 12/2003 | Xing et al. | 716/131 |
| 6,799,309 B2 * | 9/2004 | Dhanwada et al. | 716/122 |
| 6,996,512 B2 | 2/2006 | Alpert et al. | |
| 7,036,104 B1 | 4/2006 | Alpert et al. | |
| 7,062,743 B2 | 6/2006 | Kahng et al. | |
| 7,127,696 B2 | 10/2006 | Alpert et al. | |
| 7,137,081 B2 | 11/2006 | Alpert et al. | |
| 7,139,992 B2 * | 11/2006 | Xing et al. | 716/130 |
| 7,350,173 B1 * | 3/2008 | Ang et al. | 716/114 |
| 7,412,680 B1 * | 8/2008 | Gouterman et al. | 716/126 |
| 7,448,007 B2 | 11/2008 | Alpert et al. | |
| 7,676,780 B2 | 3/2010 | Alpert et al. | |
| 2008/0170514 A1 | 7/2008 | Hentschke et al. | |
| 2009/0319977 A1 | 12/2009 | Saxena et al. | |
| 2010/0292914 A1 * | 11/2010 | Vepsalainen | 701/200 |

OTHER PUBLICATIONS

"Method of Detection and Repair of Scenic Routes in Route-First Buffering Methodology", IBM, IPCOM000190526D, Dec. 3, 2009, pp. 1-2.
"Method of Placing Buffers Using Buffers Pinned Along a Global Route to Guide the Placement", IBM, IPCOM000181092D, Mar. 26, 2009, pp. 1-2.

(Continued)

Primary Examiner — Sun Lin
(74) Attorney, Agent, or Firm — Francis Lammes; Stephen J. Walder, Jr.; Libby Z. Toub

(57) ABSTRACT

A mechanism is provided for resolving uplift or coupling timing problems and slew violations without sacrificing late mode timing in integrated circuit (IC) designs. Responsive to a request being received to generate a new IC design, for each net in a plurality of nets in the new IC design, a determination is made as to whether the net is routable through a cell in a plurality of cells using a cost function associated with the cell such that a coupling capacitance associated with the net is equal to or below a predetermined coupling capacitance threshold. Responsive to net being able to be routed through the cell with the coupling capacitance being equal to or below the threshold, the net is assigned to at least one track within the cell. Responsive to all nets in the new IC design being routed, a new IC design is generated.

21 Claims, 5 Drawing Sheets

OTHER PUBLICATIONS

Alpert, Charles et al., "Buffer-Aware Routing in Integrated Circuit Design", USPTO U.S. Appl. No. 12/823,232, filed Jun. 25, 2010, 61 pages.

Cho, Minsik et al., "BoxRouter 2.0: Architecture and Implementation of a Hybrid and Robust Global Router", Dept. of ECE, The University of Texas at Austin, Austin, TX 78712, USA, 2007, 6 pages.

Fang, J.P. et al., "Simultaneous Routing and Buffering in SOC Floorplan Design", IEE Proceedings Comput. Digit. Tech., vol. 151, No. 1, Jan. 2004, 6 pages.

Gao, Jhih-Rong et al., "A New Global Router for Modern Designs", IEEE, 2008, pp. 232-237.

Kastner, Ryan et al., "An Exact Algorithm for Coupling-Free Routing", ACM, ISPD '01, Apr. 1-4, 2001, pp. 10-15.

Kastner, Ryan et al., "Coupling Aware Routing", International ASIC/SOC Conference, 2000, 5 pages.

Lyuh, Chun-Gi et al., "Coupling-Aware High-Level Interconnect Synthesis for Low Power", IEEE, 2002, pp. 609-613.

Wu, Di et al., "Coupling Aware Timing Optimization and Antenna Avoidance in Layer Assignment", ISPD '05, Apr. 3-6, 2005, ACM, pp. 20-27.

Wu, Di et al., "Timing Driven Track Routing Considering Coupling Capacitance", IEEE, 2005, pp. 1156-1159.

\* cited by examiner

RESOLVING GLOBAL COUPLING TIMING AND SLEW VIOLATIONS FOR BUFFER-DOMINATED DESIGNS

BACKGROUND

The present application relates generally to an improved data processing apparatus and method and more specifically to mechanisms for resolving coupling timing and slew violations for buffer-dominated designs.

Modern day electronics include components that use integrated circuits. Integrated circuits are electronic circuits formed using Silicon as a substrate and by adding impurities to form solid-state electronic devices, such as transistors, diodes, and resistors. Commonly known as a "chip", an integrated circuit (IC) is generally encased in hard plastic. The components in modern day electronics generally appear to be rectangular black plastic pellets with connector pins protruding from the plastic encasement.

Circuit designers use a variety of software tools to design electronic circuits that accomplish an intended task. For example, a digital circuit may be designed to accept digital inputs, perform some computation, and produce a digital output. An analog circuit may be designed to accept analog signals, manipulate the analog signals, such as by amplifying, filtering, or mixing the signals, and produce an analog or digital output. Generally, any type of circuit can be designed as an IC.

The software tools used for designing ICs produce, manipulate, or otherwise work with the circuit layout at very small scales. Some of the components that such a tool may manipulate may only measure tens of nanometers across when formed in Silicon. The designs produced and manipulated using these software tools are complex, often including millions of such components interconnected to form an intended electronic circuitry.

Interconnect performance is becoming increasingly dominant over transistor and logic performance in the deep sub-micron regime. Buffer insertion is a fundamental technology used in modern integrated circuit design methodologies. As gate delays decrease with increasing chip dimensions, however, the number of buffers required quickly rises. That is, traditional methods to resolve timing problems is assuming the design is in a good stage of late mode timing and congestion and then starting to aggressively insert buffers into a current netlist to make the interconnect wire shorter and reduce the coupling capacitance impact. Coupling capacitance is the impact one wire has on another wire. The main drawback of this method is to add extra buffer resources and often make the late mode timing worse by putting buffers in non-optimal distance.

Thus, in addition to timing issues, managing the density of an integrated circuit design is becoming more problematic. The performance of a design highly depends on how packed the logic is geographically in the physical integrated circuit. If the logic is completely spread out, the design is routable but the performance suffers significantly. On the other hand, if the logic is packed, the design is not routable but would yield the best timing characteristics. A packed design is unsuitable for later design changes, such as the insertion of additional logic, or change the size of existing logics, since there is little room for the new logic or the increased size change.

SUMMARY

In one illustrative embodiment, a method, in a data processing system, is provided for resolving uplift or coupling timing problems and slew violations without sacrificing late mode timing in integrated circuit (IC) designs. The illustrative embodiment receives a request to either generate a new IC design or fix an existing IC design. Responsive to the request being to generate the new IC design, for each net in a plurality of nets in the new IC design, the illustrative embodiment determines whether the net is routable through a cell in a plurality of cells between a starting location and a destination location associated with the net using a cost function associated with the cell such that a coupling capacitance associated with the net is equal to or below a predetermined coupling capacitance threshold. Responsive to net being able to be routed through the cell with the coupling capacitance associated with the net being equal to or below the predetermined coupling capacitance threshold, the illustrative embodiment assigns the net to at least one track within the cell. The illustrative embodiment repeats the processes of determining and assigning for each cell in the plurality of cells between the starting location and the destination location associated with the net using a cost function associated with the particular cell. Responsive to all nets in the plurality of nets in the new IC design being routed, the illustrative embodiment generates the new IC design with a complete routing of all of the plurality of nets.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism for resolving uplift or coupling timing problems and slew violations without sacrificing late mode timing. The illustrative embodiments provide a mechanism that selects the net groups (buses or wires) with coupling problems, and re-spreads the buffers uniformly through special buffering tree routing techniques and reinserts the buffers accordingly. Additionally, congestion aware wire synthesis provides for assigning victim/aggressive nets into different layers to avoid coupling problems without creating new congestions. Both techniques decrease buffering resources and may even reduce buffering resources, without impacting late mode timing and congestion.

Figure 1:
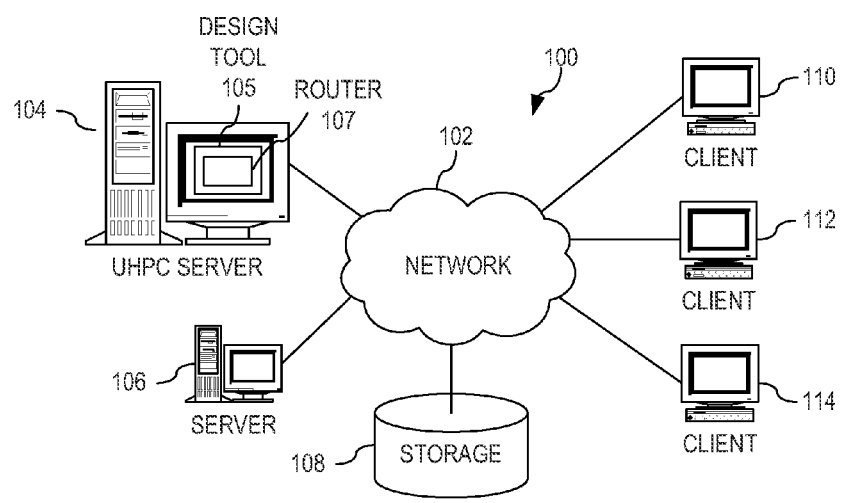
FIG. 1 depicts a pictorial representation of an example distributed data processing system in which aspects of the illustrative embodiments may be implemented.
Figure 2:
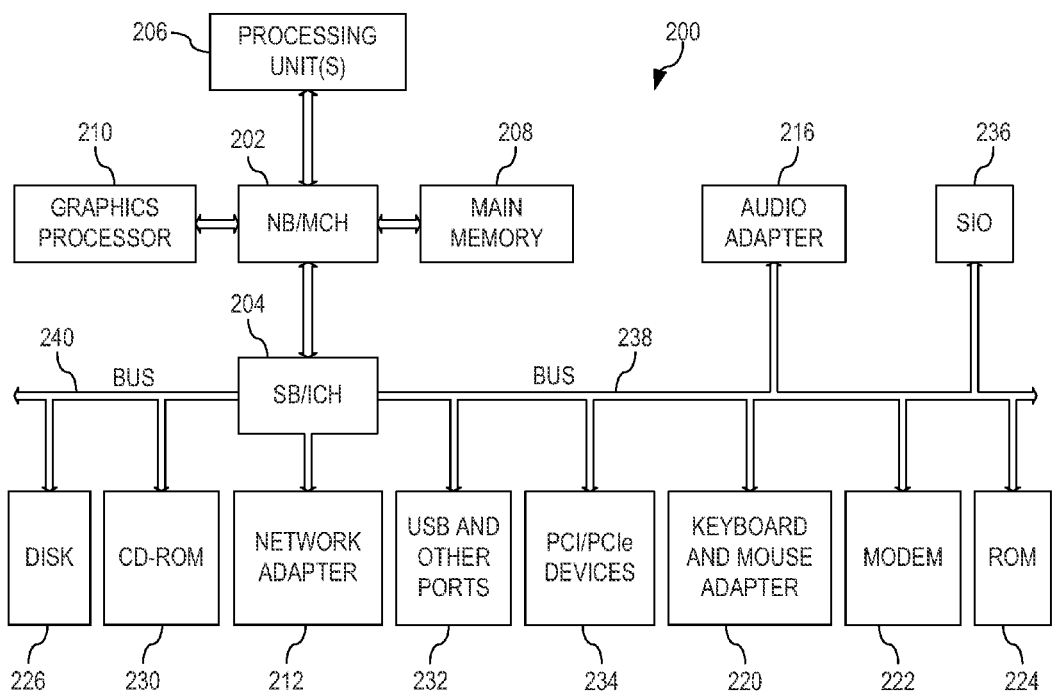
FIG. 2 shows a block diagram of an example data processing system in which aspects of the illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation of a mechanism that resolves uplift or coupling timing and slew violations for buffer-dominated designs, this is only an example and is not intended to state or imply any limitation with regard to the features of the present invention. To the contrary, the illustrative embodiments are intended to include distributed data processing environments and embodiments in which coupling timing and slew violations are resolved for buffer-dominated designs.

With reference now to the figures and in particular with reference to FIGS. 1-2, example diagrams of data processing environments are provided in which illustrative embodiments of the present invention may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like.

In the depicted example, server 104 provides data, such as boot files, operating system images, and applications to the clients 110, 112, and 114. Clients 110, 112, and 114 are clients to server 104 in the depicted example. A data processing system, such as server 104 or 106, or client 110, 112, or 114 may have software applications or software tools executing thereon. For example, server 104 may include IC design tool 105. IC design tool 105 may utilize router 107 for global routing. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM™ eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

As stated previously, the software tools used for designing integrated circuits (ICs) produce, manipulate, or otherwise work with the circuit layout at very small scales. The software tools manipulate these components at the component level or blocks of components level. A block of components is also known as a cell. A cell in an IC design is a portion of the IC design. One way of identifying cells in an IC design is to overlay a grid of imaginary vertical and horizontal lines on the design, and deeming each portion of the IC design bound by horizontal and vertical lines as a cell. The term cell is not limited only to two-dimensional cells. That is, there may be different layers of cells in a z-direction, such as different metal layers. Cells formed in this manner are commonly known as global routing cells or g-cells. Imposing such a three-dimensional grid on an IC design abstracts the global routing problem away from the actual wire implementation and gives a more mathematical representation of the task.

The IC design tool identifies gates or logic cells in the design. The IC design tool manipulates a set of the gates to legalize the design. A set of gates is one or more gate. Legalizing the design is manipulating the gates so no gates overlap each other in the rendering or when formed in die semiconducting material. A legal design results from the legalizing operation. Gates are generally allowed to touch other gates but not overlap in a legal design. A type of gate in an IC design is known as a standard gate. A standard gate is a combination of solid-state devices, such as transistors, which take a specified number of input signals and produce a specified number of output signals, and which implement one or more circuit functions, such as logical AND, or logical OR functions.

An IC design software tool can, among other functions, manipulate cells, or interconnect components of one cell with components of other cells. The interconnects between components are called wires. A wire is a connection between parts of electronic components, and is formed using a metallic material that conducts electricity. That is, a given cell includes a set of components and their interconnections and a set of components is one or more components. A cell may also include pins. A pin of a cell is a point of interconnection in the cell where a wire may be connected to couple a component of the cell with a component of another cell. In other words, pins of a cell are the locations of input/output (I/O) to and from the cell. A set of pins and a wire forming an electrical connection between cells is called a net. A netlist is a list of nets of a set of cells.

Minimizing the length of each wire in a given design is a design consideration in the design of the IC. As the wire length increases between two points, so does the delay in the signal being transmitted over the wire between the two points. To meet the timing requirement of signal, to with, to keep the delay within a specified threshold, buffers are introduced along the wire length. A buffer may be an inverter, a pair of inverters, or another set of component(s) that reduce the delay between two points in a circuit.

Another design consideration in the design of the IC is the coupling capacitance, which is a function of individual wire properties and the relationship among different wires. That is, changes in signal on one first wire may cause the electrical field around the first wire to change. This change in electrical field may be experienced by other wires in the vicinity of the first wire which may then cause a delay or timing issue in the other wires. The basic coupling capacitance may be extracted by a parasitic extraction tool that considers the electrical field and geometry of all metal shapes of all wires. When two wires are on a same layer, running parallel to each other, and are in close proximity, then more coupling capacitance may be present in the wires. The length of the parallel part is referred to as overlapping wirelength. The more overlapping wirelength, the more coupling capacitance may be present in the wires.

Coupling capacitance may also depend on the timing window of two neighboring wires. When the two neighboring wires switch at the same time and in different directions (one is from rising to failing, and another falling to rising), then there may be more coupling capacitance in the wires, i.e., real coupling capacitance=2*basic coupling capacitance (basic coupling capacitance is extracted by the extraction tool). When one wire switches and another wire keeps its signal, then real coupling capacitance=1*basic coupling capacitance. The coefficient of determining real coupling capacitance is generally called "k-factor", and this value generally depends on the timing properties of two neighboring wires which are derived from timing analysis of whole chip. One way to decide such coefficients is to use a static timing analysis tool to find out if the timing window of two wires overlap each other or not. As one can see, coupling capacitance depends on geometry of wires, as well as timing properties of the wires.

One method to resolve coupling issues is to shorten the wires to keep the signal strong and reduce the overlapping wirelength. However, by shortening the wires more buffers are introduced along the wire length, which requires more space in the layer. Another method is to reassign one wire in a different layer. Coupling capacitance become smaller for wires in different layers (i.e., if one wire is in horizontal layer k, and another wire is in vertical layer k+1, the distance and the physical overlapping area is much smaller compared to the case where both wires are in the same layer).

Placement problem is the problem of placing the cells of a chip such that the design meets all the design parameters of the chip. Routing is the process of connecting the pins after placement. In other words, placement results in a rendering of the components of various cells as being located in certain positions in the design, whereas routing results in a rendering of how the metal layers would be populated with that placement. A wire can be designed to take any one of the several available paths in a design. Placement of a wire on a certain path, or track, is a part of routing.

A router is a component of IC design tools that performs the routing function. Once the placement component—known as a placer—has performed the placement function, the router attempts to connect die wires without causing congestion and without causing timing delays. For example, if a design parameter calls for no more than five wires in a given area, the router attempts to honor that restriction in configuring the wiring. Such limitations on the wiring are a type of design constraints and are called congestion constraints. Other types of design constraints may include, for example, blocked areas—cell areas where wires may not be routed.

A global router divides the routing region into small tiles and attempts to route nets through the tiles such that no tile overflows its capacity. After global routing, wires must be assigned to actual tracks within each tile, followed by detail routing which must connect each global route to the actual pin shape on the g-cell. Another type of router—known as the detailed router—performs the detailed routing. The global and detailed routing produced during the design process is usually further modified during optimization of the design.

In a portion of the IC design process, IC design tools generally employ various steps in producing an IC design that works as intended. A circuit designer generally creates the design in a computer programming language in the form of code. The IC design tool accepts the design in the code form and generates a rendering of the design in multiple layers that have been formed in a semiconducting material to create a circuit according to that design.

Thus, the illustrative embodiments recognize that wire length, coupling capacitance, and slew rates are non-trivial problems in IC design. Slew rate represents the maximum rate of change of a signal at any point in a circuit. Further, due to these non-trivial problems, buffer insertion is also a non-trivial problem in IC design. That is, inserting buffers between two points and then optimizing the wire length connecting the two points via those buffers, places the buffers such that congestion occurs in certain areas of the design. Another concern is blockages. A blockage in a design is an area of the design where a component, such as a buffer, cannot be placed, and a wire may either not be routed over that area at all, or be routed only through corresponding areas on a specific set of layers.

The invention further recognizes that prior art routers are also incapable of handling layer specific blockages. Most prior art routers perform routing using two-dimensional (2D) technology where all the layers of a design are flattened to a single 2D layer for the purpose of solving the routing problem in one layer. The flattened 2D layer is then expanded to the various layers, the routing solution is assigned to the various layers, and corrections are made to the routing. Some prior art routers perform the routing in three dimensions (3D) where the routing is performed while maintaining the separate layers in a 3D structure. The 3D routers suffer from significantly longer runtimes than the 2D routers and still suffer from buffering problems described above.

Thus, the illustrative embodiments recognize that the present methods of routing and buffer insertion either give rise to congestion or coupling capacitance in a design. Therefore, the illustrative embodiments provide a cost function that may be used to determine whether a wire may be routed along a particular path based on the packing or coupling of the various g-cells through which the wire is to be routed.

Figure 3:
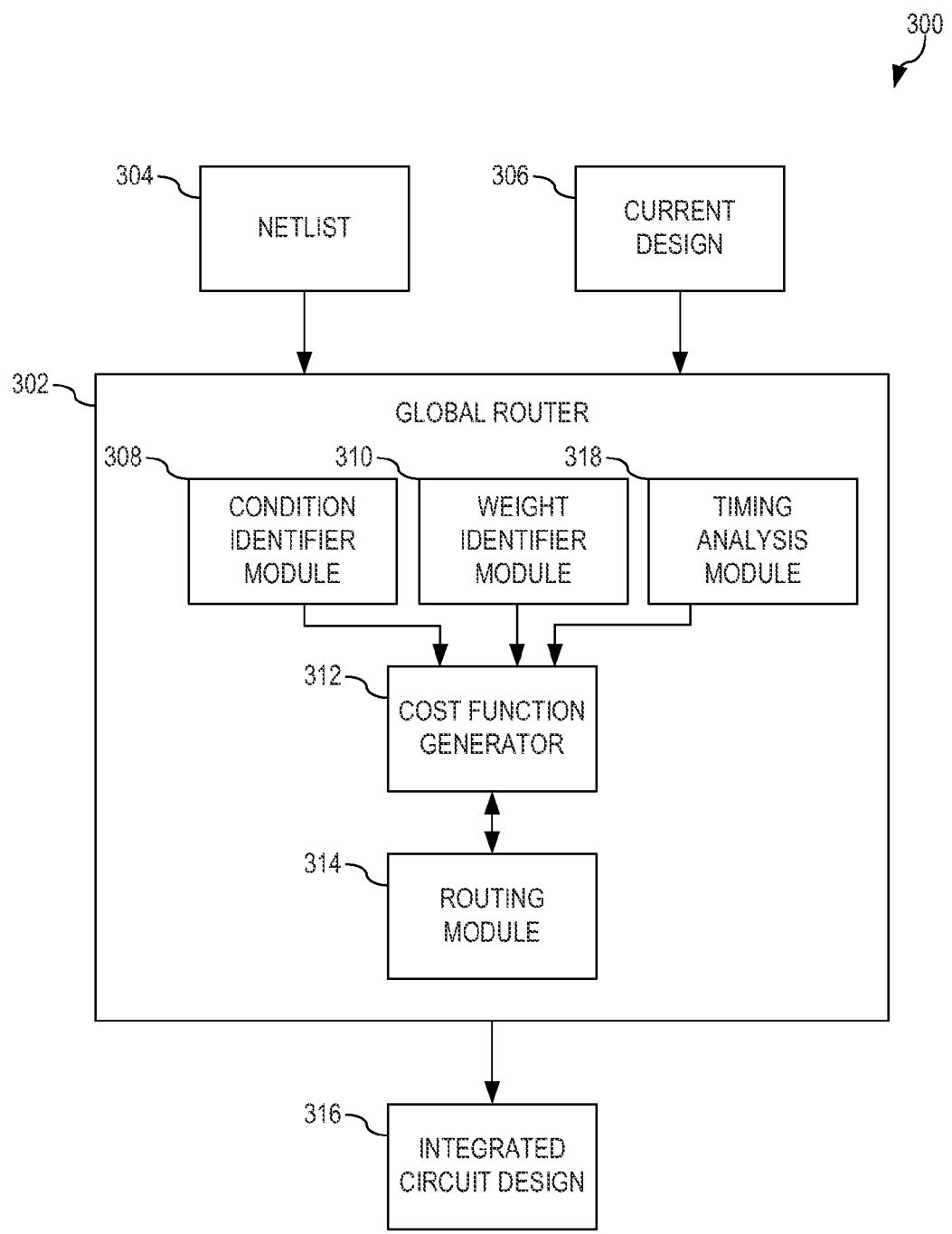
FIG. 3 depicts a block diagram of a mechanism for resolving uplift or coupling timing problems and slew violations without sacrificing late mode timing in or for an integrated circuit design in accordance with an illustrative embodiment.

FIG. 3 depicts a block diagram of a mechanism for resolving uplift or coupling timing problems and slew violations without sacrificing late mode timing in or for an integrated circuit design in accordance with an illustrative embodiment. Data processing system 300 comprises global router 302 that is configured to receive either netlist 304, which may include a set of components and a set of nets for a new integrated circuit (IC) design, or current design 306, which may be an existing IC design that has identified coupling issues between nets. Again, a net comprises a set of pins and a wire forming an electrical connection between cells, each pin being a point of interconnection with each cell.

In the event global router 302 receives netlist 304 and a request to generate a new IC design that addresses conditions such as wire length, coupling capacitance, and slew rates, global router 302 uses condition identifier module 308 to identify which nets in netlist 304 are similar nets and determine a percent of similar nets. That is, condition identifier module 308 identifies those nets in the set of nets that make up netlist 304 that share some property(ies) such as being in the same bus group where the nets go from a same starting location to a same destination location, nets that have the same phase where the nets are in the same clock cycle and have the same clock cycle delay, or the like. Condition identifier module 308 also identifies other conditions such as current congestion (which is zero at the beginning of a new design), blockages, any overlapping wirelength, any pre-identified cost associated with routing a net along a particular path, or the like. Overlapping wirelength is defined as the wirelength for the routing patterns that a series of wires that run in parallel share (i.e., for two wires that first run horizontally three g-cells from the same locations and in the same row, and then goes to different g-cells, the overlapping wirelength are a length of three g-cells. Pre-identified cost is a cost identified by a designer prior to routing that certain wires may be easily susceptible to coupling problems or a cost from last iteration about congestion and coupling information about certain wires.

Global router 302 may also use weight identifier module 310 to identify any predetermined weights that may be associated with any of the conditions. In the illustrative embodiments, weights are real numbers between 0 and 1 associated with each condition that represents the emphasis that condition has in determining a cost function, which will be described in detail below. The weights are predefined by the designer who is employing global router 302 to provide routing for an IC design. For the conditions identified by condition identifier module 308, weight identifier module 310 identifies a predetermined weight supplied by the user that is to be associated with the condition, if any. Additionally, each weight associated with each condition may be a set of weights that dynamically change as congestion increases. For example, a weight may start at 0.01 and increase to 0.1, 0.23, 0.38, 0.51, and so on as congestion increases.

Once global router 302 has identified the similar nets in netlist 304, any conditions that are associated with the new IC design that is to be generated, and/or any weights that are to be associated with the conditions, global router 302 then uses cost function generator 312 to either identify a pre-existing function or generate a cost function that is a function that is a sum of products, each product being a condition, such as percent of similar nets, pre-identified cost, congestion, blockages, overlapping wirelength, or the like, multiplied with its associated pre-determined weight, in a particular g-cell. For example, a cost function F may be:

$$F = w_1 f_1 + w_2 f_2 + w_3 f_3 + \ldots + w_n f_n + w_r f_r$$

where $w_i$ are real number weights between 0 and 1, $f_i$ are multi-dimensional functions of blockage, congestion, percent of similar nets, pre-identified cost, overlapping wirelength, or the like, and $f_r$ is a function to generate random numbers. The function $f_r$ is helpful for parallel processing of multiple nets and defines a "congestion noise margin." Congestion noise margin is the difference between the route solution of two different nets that share the exact same conditions for $f_1$ to $f_n$. Without $f_r$, it is still possible that global router 302 may route a group of nets that have all the same properties over the same routing path, which may cause coupling problems. By using function $f_r$, global router 302 may randomly distribute such a group of nets to different paths and thereby reduce coupling problems.

Figure 4:
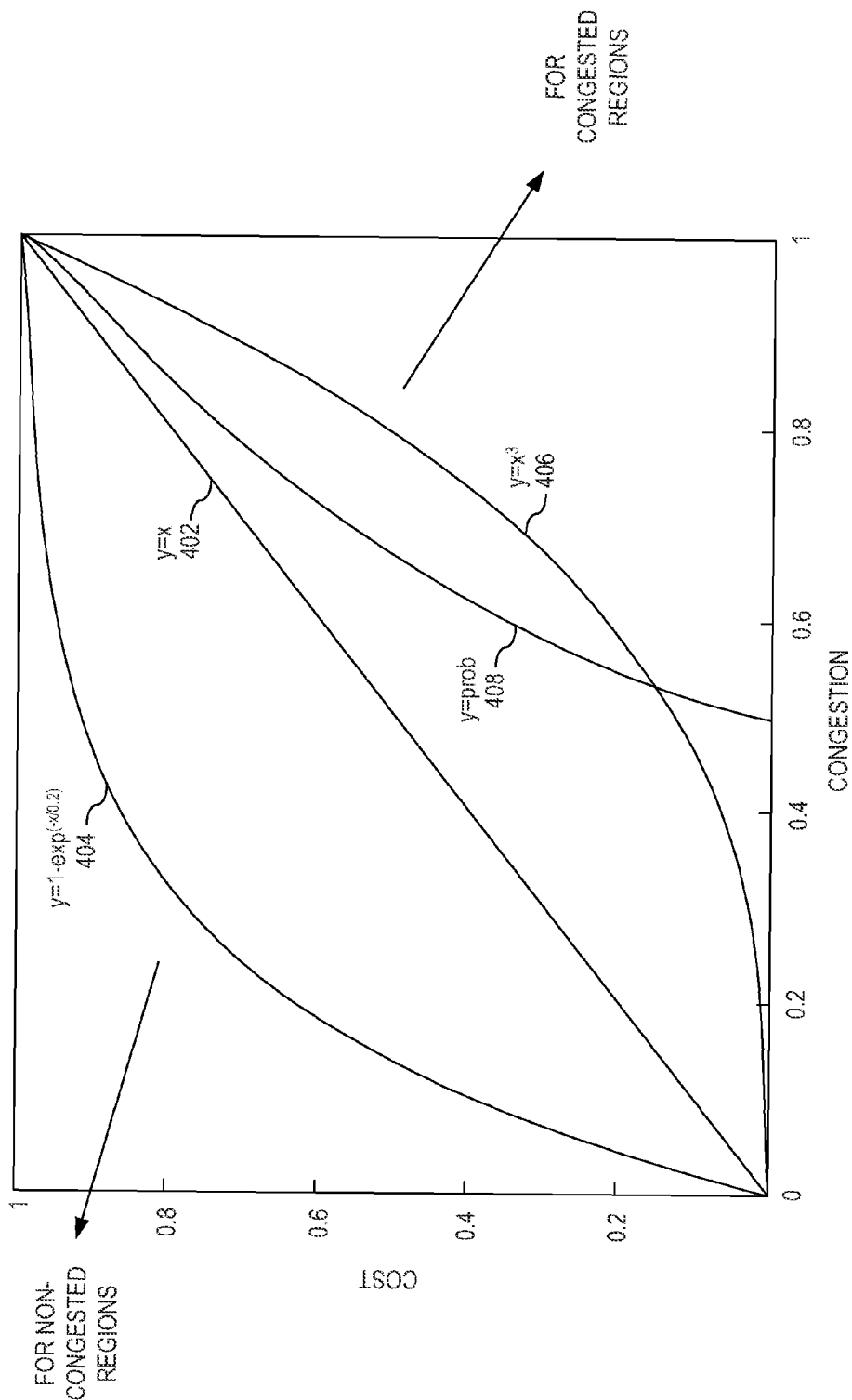
FIG. 4 depicts some exemplary cost functions in accordance with an illustrative embodiment.

FIG. 4 depicts some exemplary cost functions in accordance with an illustrative embodiment. The exemplary cost functions are one dimensional functions of wiring congestion, but as stated above, the cost function may be multi-dimensional depending on overlapping wirelength, pre-identified cost, percentage of similar nets in a g-cell or the like. In FIG. 4, all of the illustrated cost functions are monotonic functions of congestion. That is, when there is more congestion in a g-cell, then there are more nets going through that g-cell. Thus, there are more chances that two nets are close to each other and more coupling capacitance experienced in those nets as a result.

In FIG. 4, function representation 402, which is y=x, indicates cost is uniform proportionally to the congestion and the use of such function could result in uniform spreading of nets. Function representation 404, which is $y=1-\exp^{(-x/0.2)}$, indicates the rapid increase of cost when congestion of a g-cell changes from zero to just a small amount of congestion. The change of cost function starts to saturate as congestion gets bigger. Thus, when a net can be routed on a path with the set of g-cells with congestion 10 percent, the cost is much smaller than the cost if the net is routed on a path with congestion 20 percent. A function such as function representation 404 may be used in a design with much smaller congestion and, therefore, forces nets to be more spread out. Function representation 406, which is $y=x^3$, indicates the cost of g-cell only starting to show up when congestion gets bigger, say 80 percent. A function such as function representation 406 may be used to spread nets for a design with higher congestion, since function representation 406 provides significant contrast for highly congested regions. Lastly, function representation 408, which is y=prob, has no cost usage until half of the nets have been routed but results in a quick cost usage afterwards. Thus, functions, such as those represented by function representation 402, may be used in regions of the IC design where there is minimal congestion and/or blockages and functions, such as those represented by function representations 406 and 408, may be used in regions of the IC design where there is high congestion and/or blockages.

Returning to FIG. 3, once a cost function is determined, routing module 314 within global router 302 uses the cost function to determine whether a net maybe routed through a particular tile with a coupling capacitance that is below a predetermined threshold. That is, routing module 314 divides the routing region of the IC design into small tiles and attempts to route nets through the tiles such that virtually no coupling capacitance exists between the nets that are routed through the particular tile. Based on the cost function associated with each g-cell as previously described, routing module 314 may use such information to determine a route to route each net that comprises minimum cost while meeting any other constraints, such as wirelength given a certain cost upperbound. If routing module 314 determines that a net may be routed through a tile with a coupling capacitance that is below or equal to the predetermined threshold, then the net is assigned to actual tracks within that tile. Routing module 314 continues the process for each tile in the path of the net from the beginning point of the net to the ending point of the net. At the beginning and the ending points, routing module 314 also details which pin in the cell or tile that the net is to be connected to.

If routing module 314 determines that the net may not be routed through the tile with a coupling capacitance that is below the predetermined threshold, then routing module may employ the use of an iteration counter and, when the iteration is below a predetermined number of iterations, determine whether there is a different tile or a different layer within the current tile through which to run the net. As discussed previously, the routing of nets is not limited only to two-dimensional cells. That is, there may be different layers of cells in a z-direction, such as different metal layers. Therefore, routing module 314 may also employ layer assignment in order to avoid congestion. Layer assignment is the procedure performed by routing module 314 to put nets in different metal layers. In nanometer technology, different metal layers have different resistance and capacitance parasitics, and thus signals travel at different speed for different layers. By moving a net from lower metal layer to higher metal layer, routing module 314 may improve timing and slew of the net as well as reducing coupling capacitance. Layer assignment may also be used in conjunction with buffer insertion. If a route is determined though a tile with a coupling capacitance that is below the predetermined threshold, routing module 314 continues the process for each tile in the path of the net from the beginning point of the net to the ending point of the net. At the beginning and the ending points, routing module 314 also details which pin in the cell or tile that the net is to be connected to. If the iteration counter exceeds the predetermined number of iterations, indicating that routing module 314 is unable to determine a coupling capacitance that is below a predetermined threshold, and then routing module 314 may use a route that has a least coupling capacitance. Again, routing module 314 continues the process for each tile in the path of the net from the beginning point of the net to the ending point of the net. At the beginning and the ending points, routing module 314 also details which pin in the cell or tile that the net is to be connected to.

With a route determined from the beginning point of the net to the ending point of the net, routing module 314 may then proceed to perform buffer insertion. Buffering insertion is a technique that may be employed by routing module 314 that inserts a set of inverters to meet timing and slew constraints as well as reducing coupling capacitance. Routing module 314 inserts one or more buffers along a given routing topology, and in this case, routes each net takes from its beginning point to its end point as determined by routing module 314. As each net is routed from its beginning point to its end point, congestion increases within the tiles. Thus, global router 302 may continually determine a current congestion, current cost, any current overlapping wirelength, or the like, either generate a new function or select a different existing function based on the current congestion, current cost, any current overlapping wirelength, and route the next net from its beginning point to its ending point until all nets in the netlist 304 have been routed. Once routing module 314 routes all of the nets of the IC design, routing module 314 then generates IC design 316 with a complete routing of all nets.

In addition to providing a new IC design, global router 302 may also receive current design 306 and a request to resolve coupling violations using global rerouting and rebuffering. Responsive to receiving current design 306, timing analysis module 318 analyzes a timing of a complete netlist with coupling capacitance information associated with current design 306. By performing the analysis, timing analysis module 318 determines all nets that fail to meet uplift timing and slew requirements, i.e., nets that have negative slack when coupling capacitance information is considered. With the problem nets identified, condition identifier module 308 identifies any conditions such as current congestion, blockages, any overlapping wirelength, any pre-identified cost associated with the nets and their current path.

Global router 302 then uses weight identifier module 310 to identify any predetermined weights that may be associated with any of the conditions. Again, the weights are predefined by the designer who is employing global router 302 to resolve the timing issues and slew violations for the existing IC design. For the conditions identified by condition identifier module 308, weight identifier module 310 identifies a predetermined weight supplied by the user that is to be associated with the condition, if any.

Once global router 302 has identified the problem nets, any conditions that are associated with the existing IC design, and any weights that are to be associated with the conditions, global router 302 then uses cost function generator 312 to either generate a function or identify an existing function to be used with the nets that need their timing resolved. Routing module 314 then attempts to reroute one of the nets so that the timing issues and slew violations are resolved. As discussed previously, routing module 314 may also employ layer assignment in order to avoid congestion. By moving a net from lower metal layer to higher metal layer, routing module 314 may improve timing and slew of the net as well as reducing coupling capacitance. Layer assignment may also be used in conjunction with buffer insertion. Additionally, routing module 314 may delete any previous buffers on the problem nets and then insert buffers later when the net is rerouted, so that the buffers do not restrict the rerouting of the net. Routing module 314 also verifies that any determined reroute of a net does not result in causing another timing issue with another net along the new path.

Once routing module 314 generates the new route for the net, routing module 314 may perform parasitic extraction to get the new coupling capacitance between any pair of nets. The new coupling capacitance may be smaller than the input netlist due to the rerouting of one or more nets. Once routing module 314 reroutes all of the problem nets of current design 306 and verifies that any determined reroute of a net does not result in causing another timing issue with another net along the new path, routing module 314 then generates IC design 316 with a complete routing of all nets.

The illustrative embodiments provide for resolving uplift or coupling timing problems and slew violations without sacrificing late mode timing. The illustrative embodiments select the net groups (buses or wires) with coupling problems, and re-spreads the buffers uniformly through special buffering tree routing techniques and reinserts the buffers accordingly. Additionally, congestion aware wire synthesis provides for assigning victim/aggressive nets into different layers to avoid coupling problems without creating new congestions. Both techniques decrease buffering resources and may even reduce buffering resources, without impacting late mode timing and congestion.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart, illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart, and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 5:
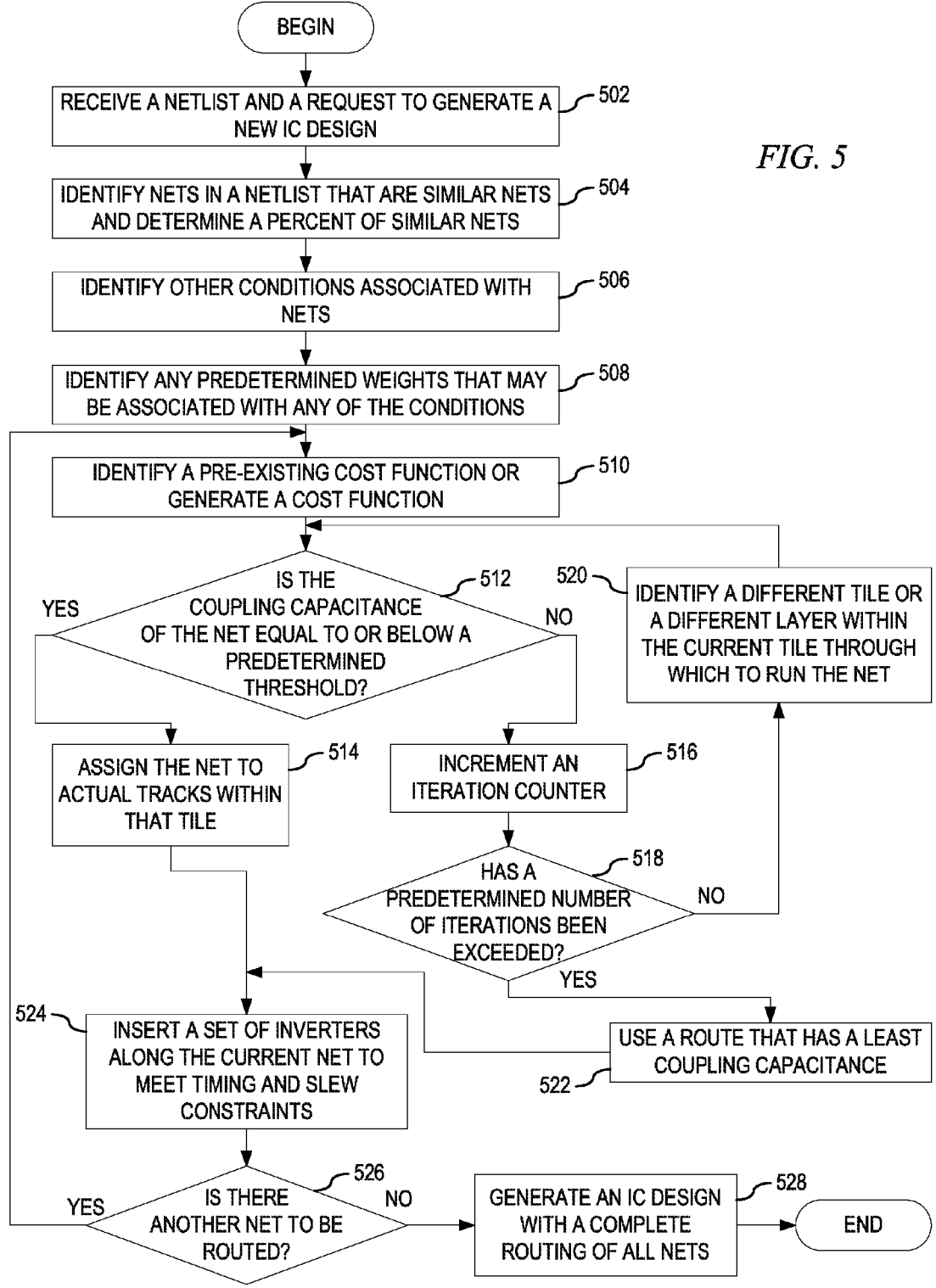
FIG. 5 depicts a flowchart outlining example operations of resolving uplift or coupling timing problems and slew violations without sacrificing late mode timing in a new IC design in accordance with an illustrative embodiment.
Figure 6:
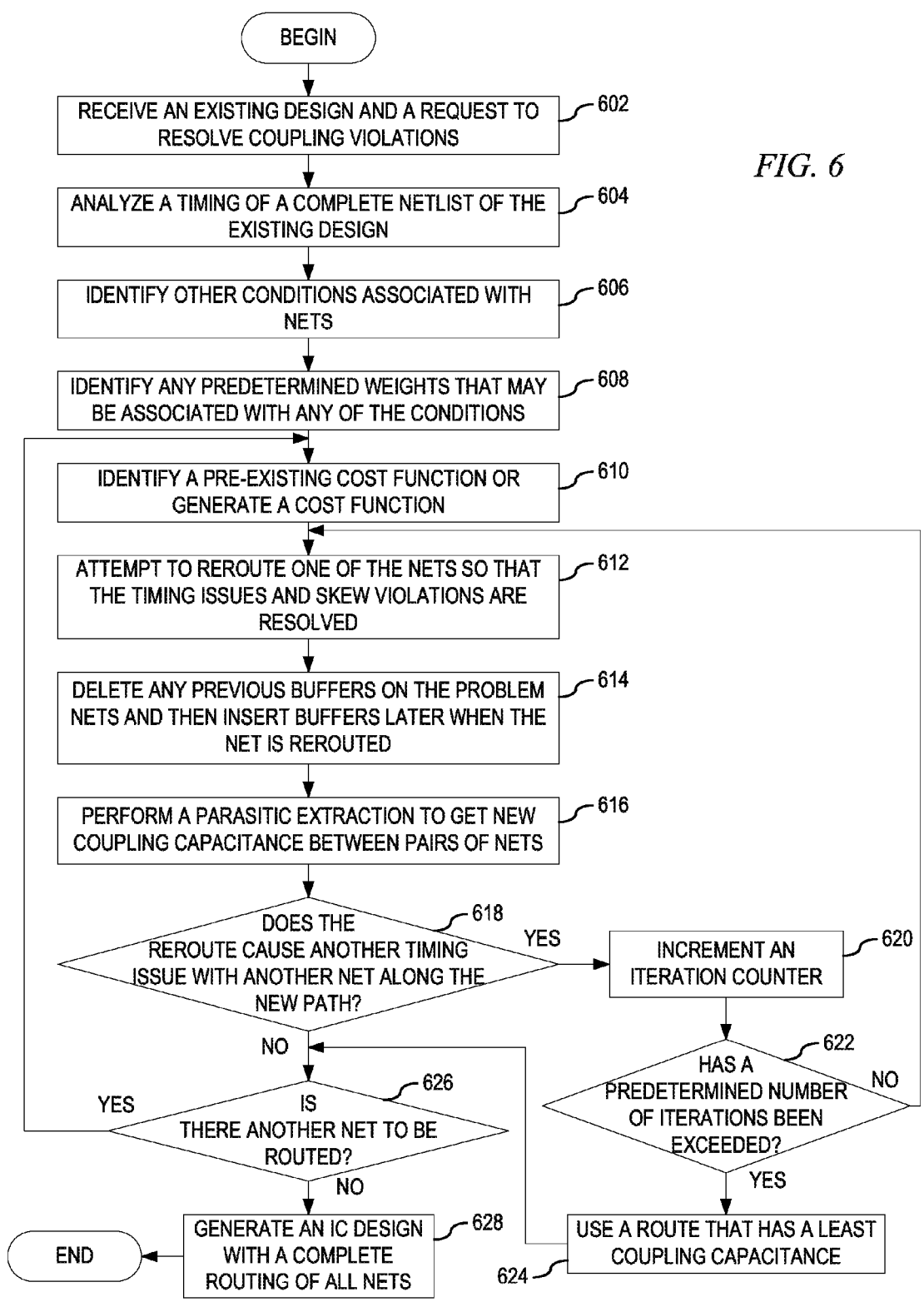
FIG. 6 depicts a flowchart outlining example operations of resolving uplift or coupling timing problems and slew violations without sacrificing late mode timing in an existing IC design in accordance with an illustrative embodiment.

Referring now to FIGS. 5 and 6, these figures provide flowcharts outlining example operations of resolving uplift or coupling timing problems and slew violations without sacrificing late mode timing in either new or existing integrated circuit (IC) designs. FIG. 5 depicts a flowchart outlining example operations of resolving uplift or coupling timing problems and slew violations without sacrificing late mode timing in a new IC design in accordance with an illustrative embodiment. As the operation begins, a global router receives a netlist and a request to generate a new IC design that addresses conditions such as wire length, coupling capacitance, and slew rates (step 502). The global router uses a condition identifier module to identify which nets in the netlist are similar nets and determine a percent of similar nets (step 504). That is, the condition identifier module identifies those nets in the set of nets that make up the netlist that share some property(ies) such as being in the same bus group where the nets go from a same starting location to a same destination location, nets that have the same phase where the nets are in the same clock cycle and have the same clock cycle delay, or the like. The condition identifier module also identifies other conditions associated with the nets such as current congestion, blockages, any overlapping wirelength, any pre-identified cost associated with routing a net along a particular path, or the like (step 506).

For the conditions identified by the condition identifier module, the global router then uses a weight identifier module to identify any predetermined weights that may be associated with any of the conditions (step 508). In the illustrative embodiments, weights are real numbers between 0 and 1 and are associated with each condition that represents the emphasis that condition has in determining a cost function. The weights are predefined by a designer of the integrated circuit who is employing the global router to provide routing for the IC design. Additionally, each weight associated with each condition may be a set of weights that dynamically change as congestion increases. For example, a weight may start at 0.01 and increase to 0.1, 0.23, 0.38, 0.51, and so on as congestion increases.

Once the global router has identified the similar nets in the netlist, any conditions that are associated with the new IC design that is to be generated, and/or any weights that are to be associated with the conditions, the global router then uses a cost function generator to either identify a pre-existing cost function or generate a cost function that is a function that is a sum of products, each product being a condition, such as percent of similar nets, pre-identified cost, congestion, blockages, overlapping wirelength, or the like, multiplied with its associated pre-determined weight, in a particular g-cell (step 510). For example, a cost function F may be:

$$F = w_1 f_1 + w_2 f_2 + w_3 f_3 + \ldots + w_n f_n + w_r f_r$$

where $w_i$ are real number weights between 0 and 1, $f_i$ are multi-dimensional functions of blockage, congestion, percent of similar nets, pre-identified cost, overlapping wirelength, or the like, and $f_r$ is a function to generate random numbers. The function $f_r$ is helpful for parallel processing of multiple nets and defines a "congestion noise margin." Congestion noise margin is the difference between the route solution of two different nets that share the exactly same conditions for $f_1$ to $f_n$. Without $f_r$, it is still possible that the global router may route a group of nets that have all same properties over the same routing path, which may cause coupling problems. By using function $f_r$, the global router may randomly distribute such a group of nets to different paths and thereby reduce coupling problems.

Once a cost function is determined, the global router uses a routing module that uses the cost function to determine whether a net may be routed through a particular tile with a coupling capacitance that is below a predetermined threshold (step 512). That is, the routing module divides the routing region of the IC design into small tiles and attempts to route each net through the tiles such that virtually no coupling capacitance exists between the nets that are routed through the particular tile. Based on the cost function associated with each g-cell, as previously described, the routing module may use such information to determine a route to route each net that comprises minimum cost while meeting any other constraints, such as wirelength given a certain cost upperbound.

If at step 512 the routing module determines that the net may be routed through the tile with a coupling capacitance that is below or equal to the predetermined threshold, then the routing module assigns the net to actual tracks within that tile (step 514). The routing module continues the process for each tile in the path of the net from the beginning point of the net to the ending point of the net. At the beginning and the ending points, the routing module also details which pin in the cell or tile that the net is to be connected to. If at step 512 the routing module determines that the net may not be routed through the tile with a coupling capacitance that is below the predetermined threshold, then the routing module increments an iteration counter (step 516) and determines whether the iteration counter has exceeded a predetermined number of iterations (step 518). If at step 518 the routing module determines that the iteration counter fails to exceed the predetermined number of iterations, then the routing module identifies a different tile or a different layer within the current tile through which to run the net (step 520). As discussed previously, the routing of nets is not limited only to two-dimensional cells. That is, there may be different layers of cells in a z-direction, such as different metal layers. Therefore, the routing module may also employ layer assignment in order to avoid congestion. Layer assignment is the procedure performed by the routing module to put nets in different metal layers. By moving a net from lower metal layer to higher metal layer, the routing module may improve timing and slew of the net and, thus, reduce the coupling capacitance associated with the net. The operation then returns to step 512 thereafter.

If at step 518 the routing module determines that the iteration counter exceeds the predetermined number of iterations, indicating that the routing module is unable to determine a coupling capacitance that is below a predetermined threshold, then the routing module may use a route that has a least coupling capacitance (step 522). At the beginning and the ending points, the routing module also details which pin in the cell or tile that the net is to be connected to. From steps 514 and 522, the routing module begins the process of buffering insertion such that the routing module inserts a set of inverters along the current net to meet timing and slew constraints (step 524). That is, the routing module inserts one or more buffers along a given routing topology, and in this case, routes each net takes from its beginning point to its end point as determined by the routing module. The routing module then determines whether there is another net that needs to be routed (step 526). If at step 526 there is another net that needs to be routed, then the operation returns to step 510 where the routing module continues the process for each tile in the path of the net from the beginning point of the net to die ending point of the net. If at step 526 there is not another net that needs to be routed, then the routing module generates an IC design with a complete routing of all nets (step 528), with the operating ending thereafter.

FIG. 6 depicts a flowchart outlining example operations of resolving uplift or coupling timing problems and slew violations without sacrificing late mode timing in an existing IC design in accordance with an illustrative embodiment. As the operation begins, the global router receives a current or existing design and a request to resolve coupling violations using global rerouting and rebuffering (step 602). Responsive to receiving the existing design, a timing analysis module in the global router analyzes a timing of a complete netlist with coupling capacitance information associated with the existing design (step 604). By performing the analysis, the timing analysis module determines all nets that fail to meet uplift timing and slew requirements, i.e., nets that have negative slack when coupling capacitance information is considered. With the problem nets identified, a condition identifier module identifies any conditions such as current congestion, blockages, any overlapping wirelength, any pre-identified cost associated with the nets and their current path (step 606).

For the conditions identified by die condition identifier module, the global router then uses a weight identifier module to identify any predetermined weights that may be associated with any of the conditions (step 608). Again, the weights are predefined by the designer who is employing the global router to resolve the timing issues and slew violations for the existing IC design. Once the global router has identified the problem nets, any conditions that are associated with the existing IC design, and any weights that are to be associated with the conditions, the global router then uses a cost function generator to either generate a function or identify a existing function to be used with the nets that need their timing resolved (step 610). The routing module then attempts to reroute one of the nets so that the timing issues and slew violations are resolved (step 612). As discussed previously, the routing module may also employ layer assignment in order to avoid congestion. By moving a net from lower metal layer to higher metal layer, the routing module may improve timing and slew of the net. Layer assignment may also be used in conjunction with buffer insertion. Additionally, the routing module may delete any previous buffers on the problem nets and then insert buffers later when the net is rerouted (step 614), so that the buffers do not restrict the rerouting of the net.

Once the routing module generates the new route for the net, the routing module performs a parasitic extraction to get the new coupling capacitance between any pair of nets (step 616). The routing module then determines that any determined reroute of a net does not result in causing another timing issue with another net along the new path (step 618). If at step 618 the reroute of the net results in causing another timing issue with another net along the new path, then the routing module increments an iteration counter (step 620) and determines whether the iteration counter has exceeded a predetermined number of iterations (step 622). If at step 622 the routing module determines that the iteration counter fails to exceed the predetermined number of iterations, then the operation returns to step 612.

If at step 622 the routing module determines that the iteration counter exceeds the predetermined number of iterations, indicating that the routing module is unable to determine a coupling capacitance that is below a predetermined threshold, then the routing module may use a route that has a least coupling capacitance (step 624). From step 624 or if at step 618 the reroute of the net fails to result in causing another timing issue with another net along the new path, the routing module then determines whether there is another problem net that needs to be rerouted (step 626). If at step 626 there is another problem net, then the operation returns to step 610. If at step 626 there is not another problem net, then the routing module generates a modified IC design with a complete routing of all nets (step 628), with the operation ending thereafter.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide a mechanism for resolving uplift or coupling timing problems and slew violations without sacrificing late mode timing. The illustrative embodiments provide a mechanism that selects the net groups (buses or wires) with coupling problems and re-spreads the buffers uniformly through special buffering tree routing techniques and reinserts the buffers accordingly. Additionally, congestion aware wire synthesis provides for assigning victim/aggressive nets into different layers to avoid coupling problems without creating new congestions. Both techniques decrease buffering resources and may even reduce buffering resources, without impacting late mode timing and congestion.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for resolving uplift or coupling timing problems and slew violations without sacrificing late mode timing in integrated circuit (IC) designs, the method comprising:

receiving, by a processor, a request to either generate a new IC design or fix an existing IC design;

responsive to the request being to generate the new IC design, for each net in a plurality of nets in the new IC design, determining, by the processor, whether the net is mutable through a cell in a plurality of cells between a starting location and a destination location associated with the net using a cost function associated with the cell such that a coupling capacitance associated with the net is equal to or below a predetermined coupling capacitance threshold;

responsive to a net being able to be routed through the cell with the coupling capacitance associated with the net being equal to or below the predetermined coupling capacitance threshold, assigning, by the processor, the net to at least one track within the cell;

repeating, by the processor, the processes of determining and assigning for each cell in the plurality of cells between the starting location and the destination location associated with the net using a cost function associated with said each cell; and responsive to all nets in the plurality of nets in the new IC design being routed, generating, by the processor, the new IC design with a complete routing of all of the plurality of nets.

2. The method of claim 1, wherein the determining whether the net is mutable through a cell in a plurality of cells between a starting location and a destination location associated with the net further comprises:

identifying, by the processor, a set of similar nets within the plurality of nets in a netlist associated with the new IC design, wherein the set of similar nets share at least one property and wherein the at least one property is at least one of being in a same bus group where nets go from a same starting location to a same destination location or nets that have a same phase where nets are in a same clock cycle and have a same clock cycle delay;

identifying, by the processor, a set of conditions associated with the set of similar nets, wherein the conditions include at least one of: current congestion, blockages, overlapping wirelength, or pre-identified cost associated with routing a net along a particular path;

identifying, by the processor, a predetermined weight associated with any of the conditions, wherein the predetermined weight is predefined by a designer of the new IC design and wherein the predetermined weight increases from 0 to 1 as congestion increases; and for each net, identifying, by the processor, a cost function for each cell in the plurality of cells in a path between the starting location and the destination location associated with said each net, wherein the cost function is a function of at least one of: percent of similar nets, the pre-identified cost, the current congestion, the blockages, or the overlapping wirelength, being multiplied with its associated pre-determined weight.

3. The method of claim 2 wherein the cost function is at least one of: a pre-existing cost function or a generated cost function.

4. The method of claim 3, wherein, responsive to the cost function being the generated cost function, the generated cost function is generated using the following cost function equation:

$$F = w_1 f_1 + w_2 f_2 + w_3 f_3 + \ldots + w_n f_n + w_r f_r$$

where $w_i$ are real number weights between 0 and 1, $f_1$ to $f_n$ are multi-dimensional functions associated with at least one of blockage, congestion, percent of similar nets, pre-identified cost, or overlapping wirelength, and $f_r$ is a function to generate random numbers.

5. The method of claim 1 flintier comprising:
responsive to a net failing to be mutable through the cell with a coupling capacitance associated with the net being equal to or below the predetermined coupling capacitance threshold, identifying, by the processor, at least one of a different cell of a different layer within a current cell through which to run the net; and
responsive to identifying either the different cell or the different layer within the current cell through which to run the net, assigning, by the processor, the net to at least one track within the different cell or the different layer within the current cell.

6. The method of claim 5, further comprising:
responsive to a failure to identify either the different cell or the different layer within the current cell through which to run the net, assigning, by the processor, the net to at least one track within a cell with a least amount of coupling capacitance.

7. The method of claim 1, further comprising:
responsive to the request being to fix the existing IC design, analyzing, by the processor, a tinting of a complete netlist with coupling capacitance information associated with the existing IC design;
identifying, by the processor, all nets in a plurality of nets associated with the existing IC design that fail to meet uplift timing and slew requirements;
for each net that fails to meet the uplift timing and slew requirements, determining, by the processor, whether the net is routable through a cell in a plurality of cells between a starting location and a destination location associated with the net using a cost function associated with the cell such that a coupling capacitance associated with the net is equal to or below a predetermined coupling capacitance threshold;
responsive to a net being able to be routed through the cell with the coupling capacitance associated with the net being equal to or below the predetermined coupling capacitance threshold, assigning, by the processor, the net to at least one track within the cell;
repeating, by the processor, the processes of determining and assigning for each cell in the plurality of cells between the starting location and the destination location associated with the net using a cost function associated with said each cell; and
responsive to all nets that fail to meet the uplift timing and slew requirements being rerouted, generating, by the processor, a modified IC design with a complete routing of all of the plurality of nets.

8. A computer program product comprising a non-transitory computer readable storage medium having a computer readable program stored therein, wherein the computer readable program, when executed on a computing device, causes the computing device to:
receive a request to either generate a new IC design or fix an existing IC design;
responsive to the request being to generate the new IC design, for each net in a plurality of nets in the new IC design, determine whether the net is routable through a cell in a plurality of cells between a starting location and a destination location associated with the net using a cost function associated with the cell such that a coupling capacitance associated with the net is equal to or below a predetermined coupling capacitance threshold;
responsive to a net being able to be routed through the cell with the coupling capacitance associated with the net being equal to or below the predetermined coupling capacitance threshold, assign the net to at least one track within the cell;
repeat the processes of determining and assigning for each cell in the plurality of cells between the starting location and the destination location associated with the net using a cost function associated with said each cell; and
responsive to all nets in the plurality of nets in the new IC design being routed, generate the new IC design with a complete routing of all of the plurality of nets.

9. The computer program product of claim 8, wherein the computer readable program to determine whether the net is routable through a cell in a plurality of cells between a starting location and a destination location associated with the net further causes the computing device to:
identify a set of similar nets within the plurality of nets in a netlist associated with the new IC design, wherein the set of similar nets share at least one property and wherein the at least one property is at least one of being in a same bus group where nets go from a same starting location to a same destination location or nets that have a same phase where nets are in a same clock cycle and have a same clock cycle delay;
identify a set of conditions associated with the set of similar nets, wherein the conditions include at least one of: current congestion, blockages, overlapping wirelength, or pre-identified cost associated with routing a net along a particular path;
identify a predetermined weight associated with any of the conditions, wherein the predetermined weight is pre-defined by a designer of the new IC design and wherein the predetermined weight increases from 0 to 1 as congestion increases; and
for each net, identify a cost function for each cell in the plurality of cells of: a path between the starting location and the destination location associated with said each net, wherein the cost function is a function of at least one of: percent of similar nets, the pre-identified cost, the current congestion, the blockages, or the overlapping wirelength, being multiplied with its associated pre-determined weight.

10. The computer program product of claim 9, wherein the cost function is at least one of: a pre-existing cost function or a generated cost function.

11. The computer program product of claim 10, wherein, responsive to the cost function being the generated cost function, the generated cost function is generated using the following cost function equation:

$$F = w_1 f_1 + w_2 f_2 + w_3 f_3 + \ldots + w_n f_n + w_r f_r$$

where $w_i$ are real number weights between 0 and 1, $f_1$ to $f_n$ are multi-dimensional functions associated with at least one of blockage, congestion, percent of similar nets, pre-identified cost, or overlapping wirelength, and $f_r$ is a function to generate random numbers.

12. The computer program product of claim 8, wherein the computer readable program further causes the computing device to:
responsive to a net failing to be mutable, through the cell with a coupling capacitance associated with the net being equal to or below the predetermined coupling capacitance threshold, identify at least one of a different cell or a different layer within a current cell through which to run the net; and
responsive to identifying either the different cell or the different layer within the current cell through which to run the net, assign the net to at least one track within the different cell or the different layer within the current cell.

13. The computer program product of claim 12, wherein the computer readable program further causes the computing device to:
responsive to a failure to identify either the different cell or the different layer within the current cell through which to run the net, assign the net to at least one track within a cell with a least amount of coupling capacitance.

14. The computer program product of claim 8, wherein the computer readable program further causes the computing device to:
responsive to the request being to fix the existing IC design, analyze a timing of a complete netlist with coupling capacitance information associated with the existing IC design;
identify all nets in a plurality of nets associated with the existing IC design that fail to meet uplift timing and slew requirements;
for each net that fails to meet the uplift timing and slew requirements, determine whether the net is mutable through, a cell in a plurality of cells between a starting location and a destination location associated with the net using a cost function associated with the cell such that a coupling capacitance associated with the net is equal to or below a predetermined coupling capacitance threshold;
responsive to a net being able to be routed through the cell with the coupling capacitance associated with the net being equal to or below the predetermined coupling capacitance threshold, assign the net to at least one track within the cell;
repeat the processes of determining and assigning for each cell in the plurality of cells between the starting location and the destination location associated with the net using a cost function associated with said each cell; and
responsive to all nets that fail to meet the uplift timing and slew requirements being rerouted, generate a modified IC design with a complete routing of all of the plurality of nets.

15. An apparatus, comprising:
a processor; and
a memory coupled to the processor, wherein the memory comprises instructions which, when executed by the processor, cause the processor to:
receive a request to either generate a new IC design or fix an existing IC design;
responsive to the request being to generate the new IC design, for each net in a plurality of nets in the new IC design, determine whether the net is routable through a cell in a plurality of cells between a starting location and a destination location associated with the net using a cost function associated with the cell such that a coupling capacitance associated with the net is equal to or below a predetermined coupling capacitance threshold;
responsive to a net being able to be routed through the cell with the coupling capacitance associated with the net being equal to or below the predetermined coupling capacitance threshold, assign the net to at least one track within the cell;
repeat the processes of determining and assigning for each cell in the plurality of cells between the starting location and the destination location associated with the net using a cost function associated with said each cell; and
responsive to all nets in the plurality of nets in the new IC design being routed, generate the new IC design with a complete routing of all of the plurality of nets.

16. The apparatus of claim 15, wherein the instructions to determine whether the net is mutable through a cell in a plurality of cells between a starting location and a destination location associated with the net further cause the processor to:
identify a set of similar nets within the plurality of nets in a netlist associated with the new IC design, wherein the set of similar nets share at least one properly and wherein the at least one property is at least one of being in a same bus group where nets go from a same starting location to as same destination location or nets that have a same phase where nets are in a same clock cycle and have a same clock cycle delay;
identify a set of conditions associated with the set of similar nets, wherein the conditions include at least one of: current congestion, blockages, overlapping wirelength, or pre-identified cost associated with routing a net along a particular path;
identify a predetermined weight associated with any of the conditions, wherein the predetermined weight is pre-defined by a designer of the new IC design and wherein the predetermined weight increases from 0 to 1 as congestion increases; and
for each net, identify a cost function for each cell in the plurality of cells in a path between the starting location and the destination location associated with said each net, wherein the cost function is a function of at least one of: percent of similar nets, the pre-identified cost, the current congestion, the blockages, or the overlapping wirelength, being multiplied with its associated pre-determined weight.

17. The apparatus of claim 16, wherein the cost function is at least one of: a pre-existing cost function or a generated cost function.

18. The apparatus of claim 17, wherein, responsive to the cost function being the generated cost function, the generated cost function is generated using the following cost function equation:

$$F = w_1 f_1 + w_2 f_2 + w_3 f_3 + \ldots + w_n f_n + w_r f_r$$

where $w_i$ are real number weights between 0 and 1, $f_1$ to $f_n$ are multi-dimensional functions associated with at least one of: blockage, congestion, percent of similar nets, pre-identified cost, or overlapping wirelength, and $f_r$ is a function to generate random numbers.

19. The apparatus of claim 15, wherein the instructions cause the processor to:
responsive to a net failing to be mutable through the cell with a coupling capacitance associated with the net being equal to or below the predetermined coupling capacitance threshold, identify at least one of a different cell or a different layer within a current cell through which to run the net; and
responsive to identifying either the different cell or the different layer within the current cell through which to run the net, assign the net to at least one track within the different cell or the different layer within the current cell.

20. The apparatus of claim 19, wherein the instructions further cause the processor to:
responsive to a failure to identify either the different cell or the different layer within the current cell through which to run the net, assign the net to at least one track within a cell with a least amount of coupling capacitance.

21. The apparatus of claim 15, wherein the instructions further cause the processor to:

responsive to the request being to fix the existing IC design, analyze a timing of a complete netlist with coupling capacitance information associated with the existing IC design;

identify all nets in a plurality of nets associated with the existing IC design that fail to meet uplift timing and slew requirements;

for each net that fails to meet the uplift timing and slew requirements, determine whether the net is mutable through a cell in a plurality of cells between a starting location and a destination location associated with the net using a cost function associated with the cell such that a coupling capacitance associated with the net is equal to or below a predetermined coupling capacitance threshold;

responsive to a net being able to be routed through the cell with the coupling capacitance associated with the net being equal to or below the predetermined coupling capacitance threshold, assign the net to at least one track within the cell;

repeat the processes of determining and assigning for each cell in the plurality of cells between the starting location and the destination location associated with the net using a cost function associated with said each cell; and responsive to all nets that fail to meet the uplift timing and slew requirements being rerouted, generate a modified IC design with a complete routing of all of the plurality of nets.

\* \* \* \* \*